US011848799B2

(12) United States Patent
Mestery et al.

(10) Patent No.: US 11,848,799 B2
(45) Date of Patent: Dec. 19, 2023

(54) DEAD PEER DETECTION ACROSS SPLIT CONTROL PLANE NODES AND DATA PLANE NODES OF A TUNNELED COMMUNICATION SESSION

(71) Applicant: Cisco Technology, Inc., San Jose, CA (US)

(72) Inventors: Kyle Andrew Donald Mestery, Woodbury, MN (US); Grzegorz Boguslaw Duraj, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/951,896

(22) Filed: Sep. 23, 2022

(65) Prior Publication Data
US 2023/0019374 A1    Jan. 19, 2023

Related U.S. Application Data

(63) Continuation of application No. 16/842,362, filed on Apr. 7, 2020, now Pat. No. 11,463,277.

(51) Int. Cl.
*H04L 12/46* (2006.01)
*H04L 41/12* (2022.01)
*H04L 9/40* (2022.01)

(52) U.S. Cl.
CPC ......... *H04L 12/4633* (2013.01); *H04L 41/12* (2013.01); *H04L 63/0485* (2013.01); *H04L 63/061* (2013.01); *H04L 63/164* (2013.01)

(58) Field of Classification Search
CPC . H04L 12/4633; H04L 41/12; H04L 63/0485; H04L 63/061; H04L 63/164

(Continued)

(56) References Cited

U.S. PATENT DOCUMENTS 7,336,515 B2 * 2/2008 Allenspach ........... H01L 29/127
                                                                  365/33
7,336,615 B1 * 2/2008 Pan ........................ H04L 43/50
                                                                  370/248
(Continued)

FOREIGN PATENT DOCUMENTS

WO    WO2019024880 A1    2/2019
WO    WO2019138415       7/2019
WO    WO2019138415 A1    7/2019

OTHER PUBLICATIONS

Office Action for U.S. Appl. No. 16/842,362, dated Feb. 18, 2022, Mestery, "Dead Peer Detection Across Split Control Plane Nodes and Data Plane Nodes of a Tunneled Communication Session", 18 pages.

(Continued)

*Primary Examiner* — Hermon Asres
(74) *Attorney, Agent, or Firm* — Lee & Hayes, P.C.

(57) ABSTRACT

Techniques for detecting inactive peers of a tunneled communication session, while allowing for a scalable tunneled protocol that includes split control plane nodes and data plane nodes are described herein. A method according to a technique described herein may include establishing a communication session between a first node and a second node in a network such that control plane traffic of the communication session flows through one or more control nodes and data plane traffic of the communication session flows through one or more data nodes different than the one or more control nodes. The method may also include receiving, at a control node, an indication from a data node that a probe message is to be generated. The probe message may be configured to determine data plane connectivity in the communication session. Additionally, the control node may generate the probe message and send it to the first node.

20 Claims, 8 Drawing Sheets

(58) Field of Classification Search
USPC .......................................................... 709/227
See application file for complete search history.

(56) References Cited

U.S. PATENT DOCUMENTS

| | | |
|---|---|---|
| 10,044,585 B2 | 8/2018 | Chen et al. |
| 10,506,082 B2 | 12/2019 | Zhang et al. |
| 2016/0080195 A1 | 3/2016 | Ramachandran et al. |
| 2017/0063671 A1 | 3/2017 | Gandhi |
| 2018/0205713 A1 | 7/2018 | Yadav et al. |
| 2018/0270118 A1* | 9/2018 | Lee ..................... H04L 41/0896 |
| 2019/0110324 A1* | 4/2019 | Xu ...................... H04L 12/4633 |
| 2020/0036679 A1* | 1/2020 | Chand ................. H04L 63/0272 |
| 2021/0314188 A1 | 10/2021 | Mestery et al. |

OTHER PUBLICATIONS

Office Action for U.S. Appl. No. 16/842,362, dated Jul. 22, 2021, Mestery, "Dead Peer Detection Across Split Control Plane Nodes and Data Plane Nodes of a Tunneled Communication Session", 16 pages.

The PCT Search Report and Written Opinion dated May 28, 2021 for PCT application No. PCT/US21/22682, 18 pages.

* cited by examiner

DEAD PEER DETECTION ACROSS SPLIT CONTROL PLANE NODES AND DATA PLANE NODES OF A TUNNELED COMMUNICATION SESSION

CROSS-REFERENCE TO RELATED APPLICATION

This patent application is a continuation of and claims priority to U.S. patent application Ser. No. 16/842,362, filed Apr. 7, 2020, which is fully incorporated herein by reference.

TECHNICAL FIELD

The present disclosure relates generally to improved techniques for detecting inactive peers of a tunneled communication session, while allowing for a scalable tunneled protocol that includes split control plane nodes and data plane nodes.

BACKGROUND

In computer networks, tunneling protocols are communications protocols that allow for the secure movement of data from one network to another. Some of these tunneling protocols may be composed of one or more subsidiary protocols that perform distinct operations from one another. For instance, Internet Protocol Security (IPsec) is a secure tunneling protocol suite that is made up of two subsidiary protocols: Internet Key Exchange (IKE), which handles control plane traffic, and Encapsulating Security Payload (ESP), which handles data plane traffic.

With the rapid advancements in cloud computing, service providers may desire to scale some of these tunneling protocols to allow for greater usage, as well as to build cloud-native, distributed head end services. However, scaling tunneling protocols to achieve these desired outcomes presents various underlying challenges. For instance, nodes of a scaled, tunneled communication session may not always have access to necessary data. Additionally, certain nodes of a scaled, tunneled communication session may not have visibility of tunnel traffic flow to determine whether traffic is flowing and/or whether peers of the communication session are inactive.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
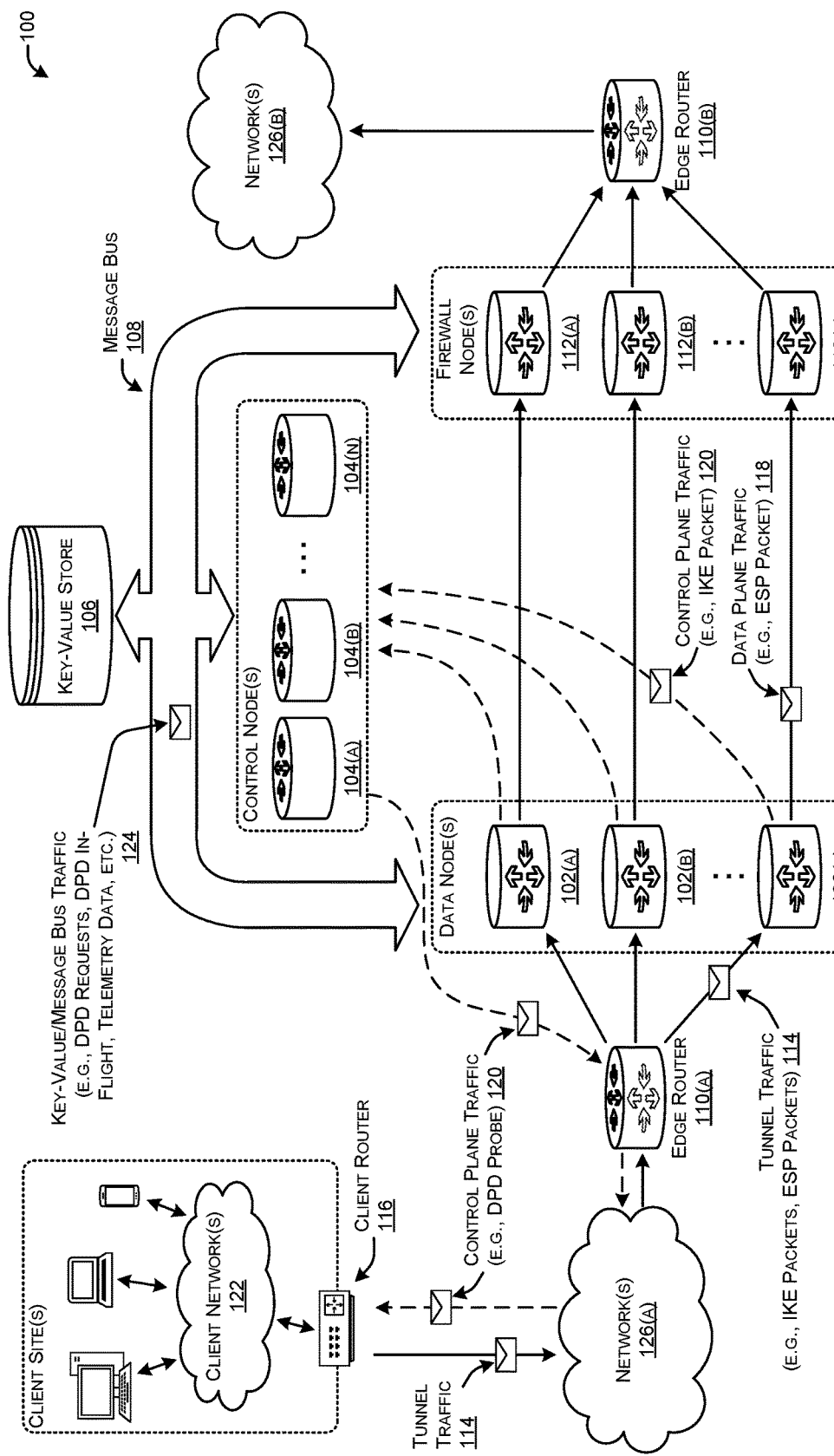
FIG. 1 illustrates a schematic view of an example system-architecture including a tunneled communication session comprising split control plane and data plane traffic flows.

This disclosure describes systems and methods that, among other things, improve technologies related to detecting inactive peers of a tunneled communication session, while allowing for a scalable tunneled protocol that includes split control plane nodes and data plane nodes. By way of example, and not limitation, a system to perform techniques described herein may include one or more processors and one or more non-transitory computer-readable media storing computer-executable instructions that, when executed by the one or more processors, cause the one or more processors to perform one or more operations. In examples, the one or more operations may include establishing a communication session between a first node and a second node in a network such that control plane traffic of the communication session flows through one or more control nodes and data plane traffic of the communication session flows through one or more data nodes different than the one or more control nodes.

Additionally, the one or more operations may include receiving, at a control node of the one or more control nodes, an indication from a data node that a probe message is to be generated that is configured to determine data plane connectivity in the communication session. At least partially responsive to receiving the indication, the control node may generate the probe message and send the probe message to the first node.

The one or more operations may further include monitoring, at a data node of the one or more data nodes, telemetry data associated with the data plane traffic. Based at least in part on this telemetry data, the data node may determine that a probe message is to be sent to the first node. Additionally, based at least in part on determining that the probe message is to be sent, the data node may send, to a control node, data indicating a request for the control node to send a probe message to the first node.

In some examples, a method to perform techniques described herein may include establishing a communication session between a first node and a second node in a network such that control plane traffic of the communication session flows through one or more control nodes and data plane traffic of the communication session flows through one or more data nodes different than the one or more control nodes. Additionally, the method may include monitoring, at a data node of the one or more data nodes, telemetry data associated with the data plane traffic. The method may further include determining, at the data node and based at least in part on the telemetry data, that a probe message is to be sent to the first node, as well as obtaining, based at least in part on determining to send the probe message, identification data associated with the first node. In some examples, the method may also include generating the probe message including the identification data and sending the probe message to the first node.

Example Embodiments

As discussed above, some tunneling protocols are composed of one or more subsidiary protocols that perform distinct operations from one another. For instance, IPsec is made up of two subsidiary protocols: IKE, which handles control plane traffic, and ESP, which handles data plane traffic. With the rapid advancements in cloud computing, service providers may desire to scale some of these tunneling protocols to allow for greater usage, as well as to build cloud-native, distributed head end services. However, scaling tunneling protocols to achieve these desired outcomes presents various underlying challenges.

Take, for example, IPsec and its two subsidiary protocols IKE and ESP. Traditionally, these two protocols are handled together on the same network device and/or node. However, according to the techniques described herein, because the IKE and ESP protocols each have independent scaling properties, splitting the protocols apart onto different nodes allows them to scale independently, resulting in greater usage that also enables construction of cloud-native, distributed IPsec head-end services. But, splitting the IKE and ESP protocols apart onto different nodes also presents various challenges.

One of these challenges is IKE Dead Peer Detection (DPD). DPD probes are IKE protocol control messages sent between nodes (e.g., an initiating node and a responding node) of an IPsec communication session that enable the nodes to keep their respective communication channels active and alive. In tunneled communication sessions that employ traditional IPsec architecture, DPD probes are usually generated and/or sent when the flow of ESP traffic between tunnel nodes decreases and/or ceases.

However, in split data plane/control plane environments according to the techniques described herein, control plane traffic (e.g., IKE protocol packets) may be handled on control nodes (e.g., IKE nodes) and data plane traffic (e.g., ESP protocol packets) may be handled on data nodes. Additionally, all tunnel traffic (e.g., control plane traffic and data plane traffic) may initially be received by the data nodes, and the control nodes may only receive control plane traffic after it is forwarded by the data nodes. As such, by scaling the IPsec tunneling protocol according to the techniques described herein, the control nodes may not have access to various data to determine when the flow of ESP traffic has decreased and/or ceased. Further, merely forwarding ESP traffic flow statistics directly from the data nodes to the control nodes would defeat the purpose of the split data plane/control plane topology described herein.

Accordingly, this disclosure describes systems and methods that, among other things, improve technologies related to detecting inactive peers of a tunneled communication session, while allowing for a scalable tunneled protocol that includes split control plane nodes and data plane nodes. For instance, in some examples, a data node (e.g., an ESP node) may send an indication to a control node (e.g., an IKE node) that a probe message (e.g., a DPD probe message) is to be generated by the control node. The data node may determine to send this indication to the control node based at least in part on monitoring data plane traffic (e.g., ESP traffic) that is associated with the tunneled communication session. Once the control node receives the notification, the control node can generate and/or send the probe message directly to the client node. In at least one example, the data node may send the probe message directly to the client node instead of requesting that the control node to generate the probe message. By using the above described techniques, more resources (e.g., processors, memory, network interfaces, etc.) of the control node are free to perform other operations, thus resulting in a more efficient use of computing resources by the data node and the control node.

In some examples, the data node may publish telemetry data associated with the data plane traffic in a key-value store that is accessible by the control node. The control node may access and/or receive the telemetry data from the key-value store and analyze the telemetry data to determine whether data plane traffic is flowing. If the control node determines that the flow of data plane traffic is decreasing and/or ceased, then the control node can generate and/or send a probe message to a client node of the tunneled communication session to determine data plane connectivity (e.g., keep the communication channel active and/or alive) in the tunneled communication session. In this way, more resources of the data node are free to perform other operations. Additionally, using the above described techniques enables the use of split control node/data node architectures for tunneled communication sessions (e.g., IPsec), thus resulting in increased scalability of tunneled networks and greater efficiencies in tunneled network traffic.

By way of example, and not limitation, a method according to this application may include establishing a communication session between a first node and a second node in a network such that control plane traffic of the communication session flows through one or more control nodes and data plane traffic of the communication session flows through one or more data nodes different than the one or more control nodes. In some examples, the communication session may include an IPsec traffic flow, the control plane traffic may include IKE protocol traffic, and the data plane traffic may include ESP protocol traffic. Additionally, the first node and/or the second node may comprise a client node, the one or more control nodes may include one or more IKE nodes, and the one or more data nodes may include ESP nodes. Additionally, in various examples, the probe message may include an IKE DPD probe message. In at least one example, the control plane traffic is routed through the one or more data nodes before arriving at the one or more control nodes.

In examples, the method may also include receiving, at a control node, an indication from a data node that a probe message is to be generated, the probe message configured to determine data plane connectivity in the communication session. For instance, the probe message may comprise an IKE DPD probe message. Additionally, the control node may include an IKE node and the data node may include an ESP node. In some examples, the control node may generate the probe message and send the probe message to the first node.

In at least one example, receiving the indication that the probe message is to be generated may include receiving, at the control node, telemetry data associated with the data plane traffic of the communication session. The telemetry data may be gathered by a data node that is performing telemetry on the data plane traffic and/or the communication session. Additionally, or alternatively, the control node may access a key-value store that is associated with the communication session and in which the telemetry data is published by the data node. In some examples, the control node may determine, based at least in part on the telemetry data, that the data plane traffic is inactive and, at least partially in response, determine to generate send the probe message to the first node.

In examples, data nodes and control nodes may communicate data to one another over a message bus that is associated with the communication session. As such, in at least one example, the method may include receiving, at one or more control nodes and via the message bus, a prompt from a data node. The prompt may include an indication for a control node of the one or more control nodes to generate the probe message. Based at least in part on the prompt, the control node may determine that it is associated with the communication session between the first node and the second node. As such, based at least in part on determining that the control node is associated with the communication session between the first node and the second node, the control node may generate and send the probe message to the first node. In some examples, the control node may send, to the message bus, data indicating that the probe message was sent. In this way, the data node may receive the data indicating the probe message was sent from the message bus.

In at least one example, the method may include receiving, at the control node and from at least one of the data node or the first node, a response to the probe message indicating that the communication session between the first node and the second node is active.

The method may also include monitoring, at a data node, telemetry data associated with the data plane traffic. For instance, the data node may analyze the telemetry data to determine that a probe message is to be sent to the first node. Additionally, the data node may send, to a control node, data indicating a request for the control node to send a probe message to the first node. In some examples, sending the data indicating the request may be based at least in part on determining that the probe message is to be sent. Additionally, in at least one example, sending the data indicating the request for the control node to send the probe message may include signaling, through a message bus associated with the communication session, that the probe message needs to be sent to the first node.

In some examples, the data node may analyze the telemetry data to determine a lapse in the flow of data plane traffic between the first node and the second node. Additionally, or alternatively, the data node may determine an error condition associated with the communication session between the first node and the second node. As such, determining that the probe message is to be sent may be based in part on at least one of the lapse in the flow of data plane traffic or the error condition. Additionally, determining that the probe message is to be sent may be based on other factors, such as sending the probe message according to a predetermined schedule (e.g., every cycle, once a second, once a minute, hourly, daily, etc.). In some examples, the telemetry data may include any kind of logical representation of the tunneled traffic, such as virtual tunnel interface (VTI) data associated with the communication session, tunnel data associated with the communication session (e.g., IPsec tunnel data), XFRM interface data associated with the communication session, and the like.

The method may, in some instances, include receiving, at the one or more data nodes and from a message bus associated with the communication session, data indicating that a message was sent to the message bus, the message indicating that the control node sent the probe message to the first node. A data node of the one or more data nodes may additionally determine that the data node is associated with the communication session between the first node and the second node. In this way, based at least in part on determining that the data node is associated with the communication session, the data node may receive the message from the message bus.

In various examples, a data node may send the probe message directly to a client node, instead of requesting that a control node generate and/or send the probe message. For instance, the method may include obtaining, at the data node and based at least in part on determining to send the probe message, identification data associated with the first node (e.g., client node). The identification data may comprise key-value data associated with the first node, and the data node may obtain the key-value data from a key-value store associated with the communication session. In this way, the data node may generate the probe message including the identification data and send the probe message to the first node.

In some examples, the data node may send, to a message bus associated with the communication session, data indicating that the probe message was sent to the first node. In some instances, this may be based at least in part on sending the probe message to the first node. Additionally, or alternatively, the method may further include receiving, at the data node and from the first node, a response to the probe message indicating that the communication session between the first node and the second node is active. The data node may forward the response to the probe message to a control node of the one or more control nodes.

The techniques described herein are generally applicable for any type of computing device or node enables communication sessions. Additionally, the techniques are equally applicable to any type of communication protocol, including tunneled protocols, and packet structure. Additionally, although the various examples described herein are with respect to IPsec, it is contemplated that the techniques of this application may be applied to other protocols, including various versions of IPsec for different communication standards (e.g., Transmission Control Protocol (TCP), User Datagram Protocol (UDP), etc.), as well as other tunneling protocols (e.g., Network Address Translation-Traversal (NAT-T)).

According to the techniques described herein, probe messages (e.g., DPD probe messages) may be sent to client nodes of a tunneled communication session in which data plane traffic and control plane traffic of the communication session is split onto data nodes and control nodes respectively. This has the effect of allowing scalability of the tunneled communication session, including computing architectures associated with tunneled communication sessions, which has substantial benefits over prior methods by ensuring that communication channels remain active in a split control plane/data plane topology.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic view of an example system-architecture 100 including a tunneled communication session comprising split control plane and data plane traffic flows. As shown, the system-architecture 100 may include one or more data nodes, such as data nodes 102(a)-102(n) (hereinafter referred to collectively as "data nodes 102") (where n represents any number greater than or equal to one), and one or more control nodes, such as control nodes 104(a)-104(n) (hereinafter referred to collectively as "control nodes 104") (where n represents any number greater than or equal to one). Additionally, the system-architecture 100 may include a key-value store 106, a message bus 108, one or more edge routers, such as edge routers 110(a) and 110(b), and one or more firewall nodes, such as firewall nodes 112(a)-112(n) (hereinafter referred to collectively as "firewall nodes 112") (where n represents any number greater than or equal to one).

In some examples, the data nodes 102 may comprise ESP data nodes associated with a split IKE/ESP IPsec communication channel. The data nodes 102 may receive tunnel traffic 114 that, in some examples, comprises one or more protocols. For instance, the tunnel traffic 114 may include IKE protocol packets and/or ESP protocol packets. The data nodes 102 may receive the tunnel traffic 114 from an edge router, such as edge router 110(a), a client router, such as client router 116, or from another device and/or node. The data nodes 102 may split the tunnel traffic 114 into respective protocols. For instance, the data nodes 102 may split the tunnel traffic 114 into data plane traffic (e.g., ESP protocol packets) 118 and/or control plane traffic (e.g., IKE protocol packets) 120. Additionally, or alternatively, the data nodes 102 may forward data plane traffic 118 to respective firewall nodes 112 and/or other nodes and/or devices, as well as forward control plane traffic to respective control nodes 104.

The control nodes 104 may, in at least some examples, comprise IKE nodes of a split IKE/ESP IPsec communication channel. The control nodes 104 may receive control plane traffic 120 from the data nodes 102. The control plane traffic 120 may, in some examples, comprise IKE protocol packets associated with an IPsec traffic flow. In some examples, the control nodes 104 may send control plane traffic 120, including DPD probes to various client nodes, such as a client node residing on client router 116 and/or one or more client networks 122.

The key-value store 106 may include one or more databases that are accessible to the data nodes 102, the control nodes 104, and/or other nodes and/or devices associated with the tunneled communication channel. In some examples, the data nodes 102, the control nodes 104, and/or other nodes and/or devices associated with the tunneled communication channel may read data from and/or write data to the key-value store 106 using whatever protocol the key-value store 106 exposes. In at least one example, nodes may read data from and/or write data to the key-value stare 106 via the message bus 108. For instance, the data nodes 102 may perform telemetry and write telemetry data to the key-value store 106 via the message bus 108. Additionally, the control nodes 104 may read telemetry data from the key-value store 106 via the message bus. The key-value store 106 may store identification data associated with various nodes and/or devices of the tunneled communication session, message IDs associated with the tunneled communication session, and other data described herein, such as interface statistics, tunnel traffic data, etc.

In some examples, the databases and/or data that are stored by the key-value store 106 may be stored on the various nodes of the tunneled communication channel, and the nodes may communicate with each other directly to access the databases and/or data. The nodes may communicate directly with each other by use of application programming interfaces (APIs), some form of a remote procedure call (RPC) protocol (e.g., gRPC), and the like. By way of example, and not limitation, the telemetry data may be stored at the various data nodes of the communication channel and/or the control nodes. Additionally, or alternatively, identification data associated with the various nodes and/or devices of the tunneled communication channel may be stored at the data nodes and/or the control nodes. In this way, the key-value store 106 may be omitted from the system-architecture 100 if desired, or the key-value store 106 may be used for essential data/constructs.

The message bus 108 may facilitate communication of data, such as key-value/message bus traffic 124, between one or more of the respective nodes of the system-architecture 100, such as the data nodes 102, the control nodes 104, the key-value store 106, and/or the firewall nodes 112. In some examples, the key-value/message bus traffic 124 may include DPD probe requests, DPD in-flight notifications, telemetry data, as well as other communication data.

Although depicted in FIG. 1 as standalone hardware modules, it should be understood that the data nodes 102, the control nodes 104, the key-value store 106, and/or the firewall nodes 112 may be software components at least partially residing in memory. In this way, one or more processors may execute instructions that cause the one or more processors to perform all of the operations described herein with respect to the data nodes 102, the control nodes 104, the key-value store 106, and/or the firewall nodes 112. In some instances, the data nodes 102, the control nodes 104, the key-value store 106, and/or the firewall nodes 112 may be individual hardware components and/or software components that reside in a standalone device or a system of standalone devices. Additionally, or alternatively, the data nodes 102, the control nodes 104, the key-value store 106, and/or the firewall nodes 112 may include any type of networking device, such as servers, switches, routers, hubs, bridges, gateways, modems, repeaters, access points, etc.

Edge routers 110(a) and/or 110(b) may route tunnel traffic data 114 to various data nodes 102 of the tunneled communication session. Additionally, or alternatively, the edge routers 110(a) and/or 110(b) may route control plane traffic 120 and/or DPD probes to client nodes, such as client router 116. The edge routers 110(a) and 110(b) may facilitate the tunneled traffic flow between one or more networks, such as networks 126. The edge routers 110(a) and 110(b) may include any type of networking device, such as servers, switches, routers, hubs, bridges, gateways, modems, repeaters, access points, etc.

The client router 116 may, in some examples, perform an initial tunneling/encapsulation of data to route the data from the networks 126(a) to networks 126(b). The networks of FIG. 1, including the client networks 122 and the networks 126(a) and 126(b), may include one or more networks implemented by any viable communication technology, such as wired and/or wireless modalities and/or technologies. The client networks 122 and/or the networks 126(a) and 126(b) may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

Figure 2:
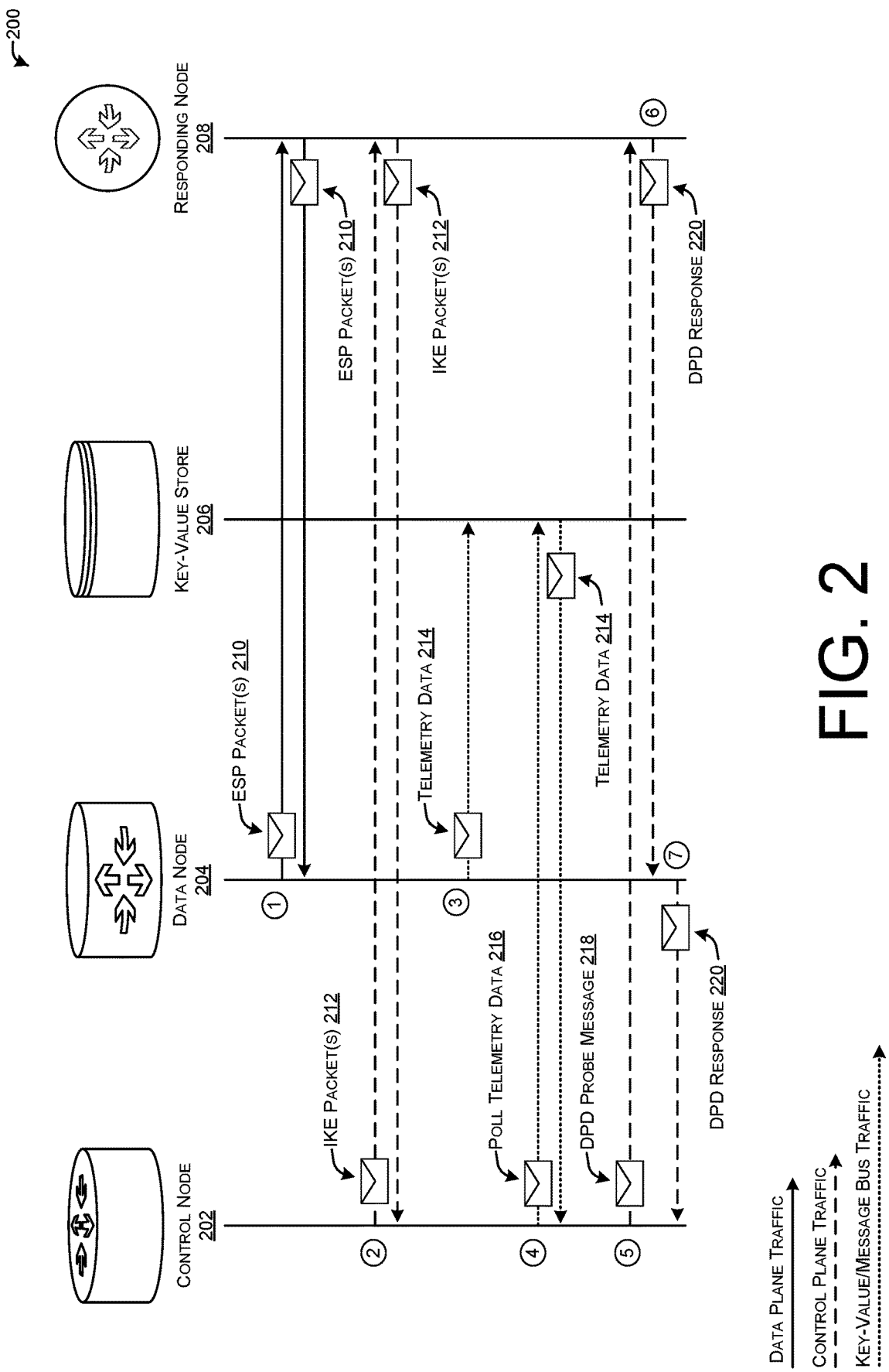
FIG. 2 illustrates a data flow diagram of an example traffic flow between various nodes of a tunneled communication session according to at least one of the technologies presented herein.

FIG. 2 illustrates a data flow diagram of an example traffic flow 200 between various nodes of a tunneled communication session according to at least one of the technologies presented herein. As shown in FIG. 2, solid line-arrows represent data plane traffic, dashed line-arrows represent control plane traffic, and dotted line-arrows represent key-value/message bus traffic.

The traffic flow 200 includes various packets/data communicated between a control node 202, a data node 204, a key-value store 206, and a responding node 208. In examples, the control node 202 may correspond with one of the control nodes 104 described above, the data node 204 may correspond with one of the data nodes 102 described above, and/or the key-value store 206 may correspond with key-value store 106 described above.

According to the example traffic flow 200, at 1, the data node 204 and the responding node 208 may send and/or receive, via the data plane traffic communication channel, one or more ESP packets 210. Additionally, at 2, the control node 202 and the responding node 208 may send and/or receive, via the control plane traffic communication channel, one or more IKE packets 212.

At 3, the data node may send and/or publish telemetry data 214 to the key-value store 206 via the key-value/message bus traffic channel. The telemetry data 214 may be associated with the one or more ESP packets 210 and/or the data plane traffic channel. The data node 204 may, in some examples, send and/or publish the telemetry data 214 according to a predetermined schedule (e.g., every processor cycle, every second, every minute, hourly, daily, etc.). Additionally, or alternatively, the data node 204 may send and/or publish the telemetry data 214 every time the data node 204 receives an ESP packet from the responding node 208.

At 4, the control node 202 may request and/or poll 216 the key-value store 206 for the telemetry data 214, and the key-value store 206 may send the telemetry data 214 to the control node 202. This exchange may be facilitated via the key-value/message bus traffic channel. In this way, the control node 202 may closely monitor the telemetry day 214 associated with the data plane traffic to determine whether to send a DPD probe message.

At 5, the control node 202 may generate and send a DPD probe message 218 to the responding node 208 via the control plane traffic channel. At 6, the responding node 208 may send a DPD response message 220 to at least one of the data node 204 and/or the control node 202. In some examples, the responding node 208 may send the DPD response message 220 directly to the control node 202. Additionally, or alternatively, the responding node 208 may send the DPD response message 208 to the data node 204, as shown, and at 7, the data node 204 may forward the DPD response message 220 to the control node 202.

Although exemplary FIG. 2 is shown with respect to an example IPsec traffic flow, it should be understood that the above described techniques may be applied to other communication protocols and/or tunneling protocols as well.

Figure 3:
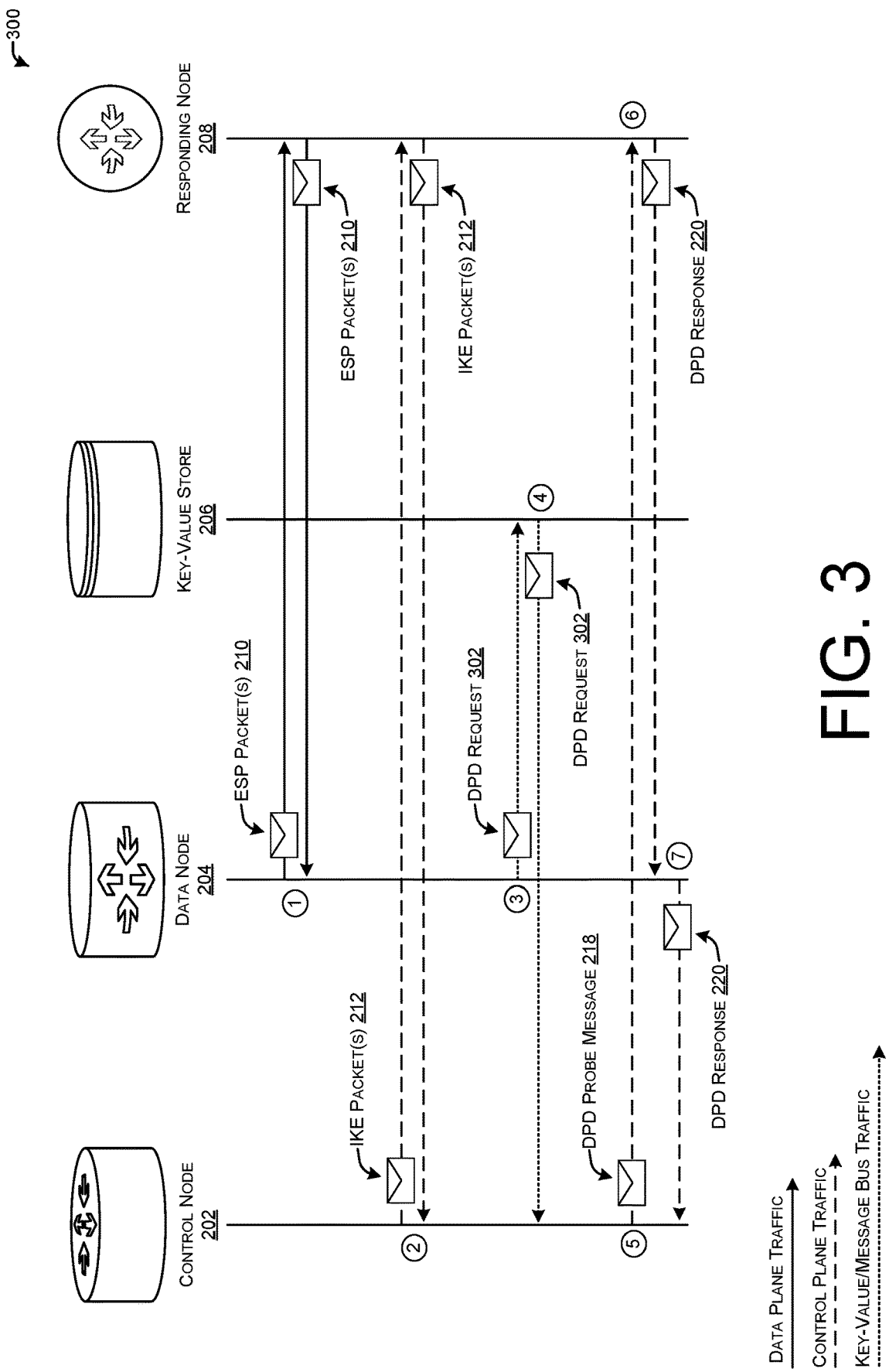
FIG. 3 illustrates a data flow diagram of another example traffic flow between various nodes of a tunneled communication session according to at least one of the technologies presented herein.

FIG. 3 illustrates a data flow diagram of another example traffic flow 300 between various nodes of a tunneled communication session according to at least one of the technologies presented herein. In FIG. 3, solid line-arrows represent data plane traffic, dashed line-arrows represent control plane traffic, and dotted line-arrows represent key-value/message bus traffic.

According to the example traffic flow 300, at 1, the data node 204 and the responding node 208 may send and/or receive, via the data plane traffic communication channel, one or more ESP packets 210. Additionally, at 2, the control node 202 and the responding node 208 may send and/or receive, via the control plane traffic communication channel, one or more IKE packets 212.

At 3, the data node 204 may send a DPD request 302 to the key-value store 206 via the key-value/message bus traffic channel. In some examples, sending the DPD request 302 to the key-value store 206 may include broadcasting the DPD request 302 to one or more control nodes associated with the traffic flow. In some examples, the data node 204 may determine to send the DPD request 302 to the key-value store 206 based at least in part on monitoring telemetry data associated with the data plane traffic channel. For instance, the data node 204 may determine, based on analyzing the telemetry data, that traffic on the data plane traffic channel is decreasing and or ceased before sending the DPD request 302.

At 4, the control node 202 may receive the DPD request 302 from the key-value store 206 and/or from a message bus via the key-value/message bus traffic channel. In some examples, one or more control nodes may receive the DPD request 302. However, based on the DPD request 302, a control node may determine whether it is associated with the communication session with the responding node 208 (e.g., whether the control node had been sending IKE packets 212 to the responding node 208). In this way, control nodes that are not associated with the communication session with the responding node 208 may silently drop the DPD request message 302. Additionally, the control node that is associated with the communication session with the responding node 208, in this example, control node 202, may process the DPD request 302 and generate a DPD probe message, such as DPD probe message 218.

At 5, the control node 202 that received the DPD request 302 may generate and send the DPD probe message 218 to the responding node 208 via the control plane traffic channel. At 6, the responding node 208 may receive the DPD probe message 218 from the control node 202 via the control plane traffic channel and, in response, may send a DPD response message 220 to at least one of the data node 204 and/or the control node 202. In some examples, the responding node 208 may send the DPD response message 220 directly to the control node 202. Additionally, or alternatively, the responding node 208 may send the DPD response message 208 to the data node 204, as shown, and at 7, the data node 204 may forward the DPD response message 220 to the control node 202.

While exemplary FIG. 3 is shown with respect to an example IPsec traffic flow, it should be understood that the above described techniques may be applied to other communication protocols and/or tunneling protocols as well.

Figure 4:
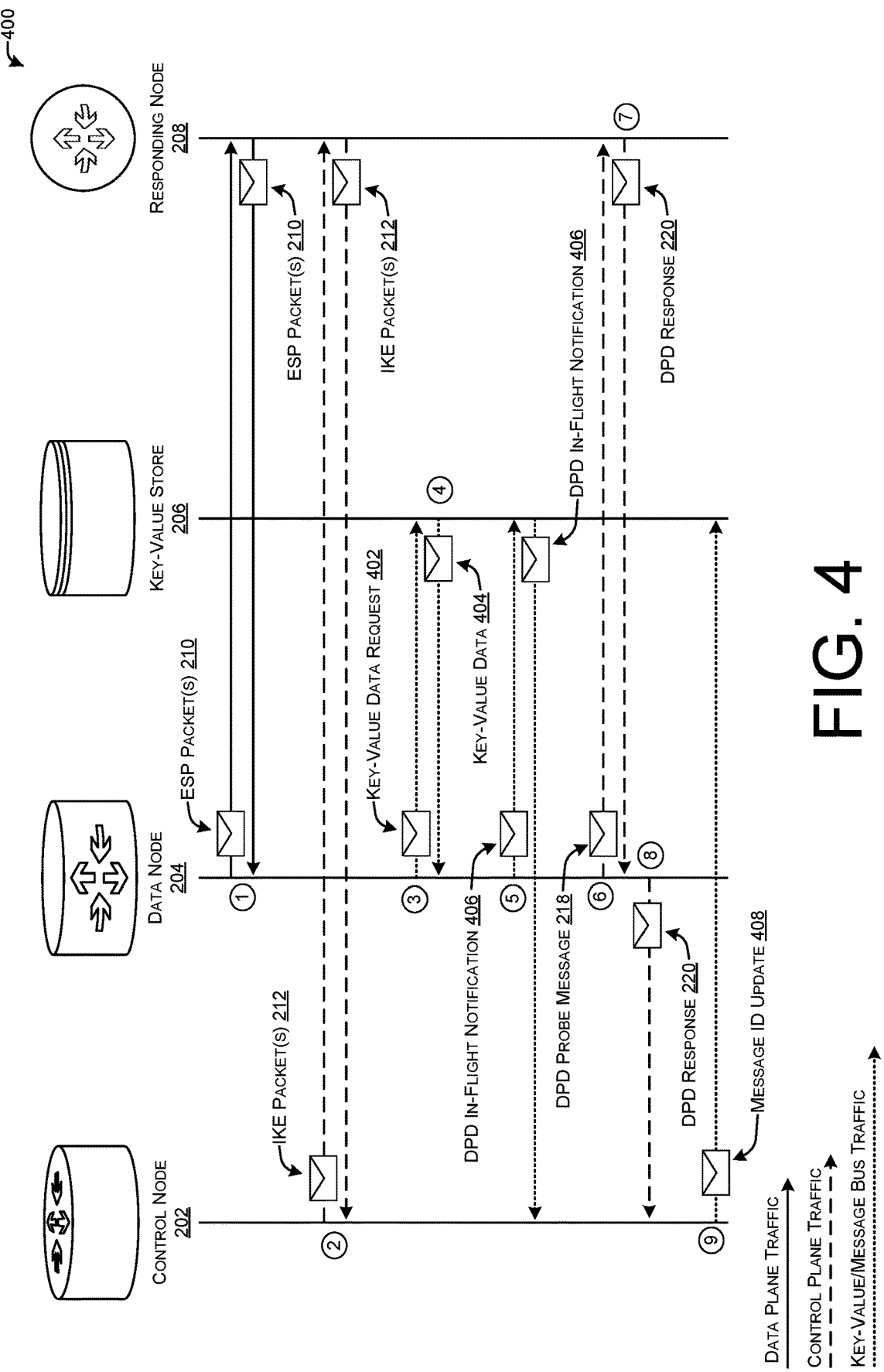
FIG. 4 illustrates a data flow diagram of yet another example traffic flow between various nodes of a tunneled communication session according to at least one of the technologies presented herein.

FIG. 4 illustrates a data flow diagram of yet another example traffic flow 400 between various nodes of a tunneled communication session according to at least one of the technologies presented herein. In FIG. 4, solid line-arrows represent data plane traffic, dashed line-arrows represent control plane traffic, and dotted line-arrows represent key-value/message bus traffic.

According to the example traffic flow 400, at 1, the data node 204 and the responding node 208 may send and/or receive, via the data plane traffic communication channel, one or more ESP packets 210. Additionally, at 2, the control node 202 and the responding node 208 may send and/or receive, via the control plane traffic communication channel, one or more IKE packets 212.

At 3, the data node 204 may send a key-value data request 402 to the key-value store 206 via the key-value/message bus traffic channel. In some examples, sending the key-value data request 402 may be based at least in part on the data node 204 determining that a DPD probe message is to be sent to the responding node 208. For instance, the data node 204 may analyze telemetry data and determine that traffic on the data plane traffic channel is decreasing and or ceasing. As such, the data node 204 may send the key-value data request 402 in order to determine message IDs and/or other identification data associated with the responding node 208, the control plane traffic channel, and/or the control node 202. In this way, the data node 204 may be able to send a DPD probe message directly to the responding node 208 via the control plane traffic channel.

At 4, the data node 204 may receive key-value data 404 from the key-value store 206. The key-value data 404 may include message IDs and/or other identification data associated with the responding node 208, the control plane traffic channel, and/or the control node 202. At 5, the data node 204 may send a DPD in-flight notification 406 to the key-value store 206 via the key-value/message bus traffic channel. In some examples, sending the DPD in-flight notification 406 may comprise broadcasting the DPD in-flight notification 406 on the message bus. In this way, the control node 202 may receive the DPD in-flight notification 406.

In at least one example, one or more control nodes may receive the DPD in-flight notification 406. Based on receiving the DPD in-flight notification 406, the one or more control nodes may determine whether they are associated with the control plane traffic channel and/or the responding node 208 (e.g., whether they have an open control plane traffic session with the responding node 208). In this way, the one or more control nodes that are not associated with the control plane traffic channel and/or the responding node 208 may silently drop the message. However, the control node 202 that has the open control plane traffic session with the responding node 208 may process the DPD in-flight notification 406 instead of silently dropping the notification.

At 6, the data node 204 may generate and send a DPD probe message 218 to the responding node 208 via the control plane traffic channel. In some examples, sending the DPD probe message 218 may be based at least in part on receiving the key-value data 404 as describe above. Additionally, or alternatively, the DPD probe message 218 may include at least a portion of the key-value data (e.g., as a routing header and/or address). At 7, the responding node 208 may receive the DPD probe message 218 from the data node 204 via the control plane traffic channel and, in response, may send a DPD response message 220 to at least one of the data node 204 and/or the control node 202. In some examples, the responding node 208 may send the DPD response message 220 directly to the control node 202. Additionally, or alternatively, the responding node 208 may send the DPD response message 208 to the data node 204, as shown, and at 8, the data node 204 may forward the DPD response message 220 to the control node 202.

At 9, the control node 202 may send a message ID update 408 to the key-value store via the key-value/message bus traffic channel. In this way, the key-value store may use the message ID updated to update a message ID associated with the responding node 208 and/or to update key-value data associated with the traffic flow 400. In at least one examples, sending the message ID update 408 to the key-value store 206 may be based at least in part on receiving the DPD response 220.

Additionally, while exemplary FIG. 4 is shown with respect to an example IPsec traffic flow, it should be understood that the above described techniques may be applied to other communication protocols and/or tunneling protocols as well.

Figure 5:
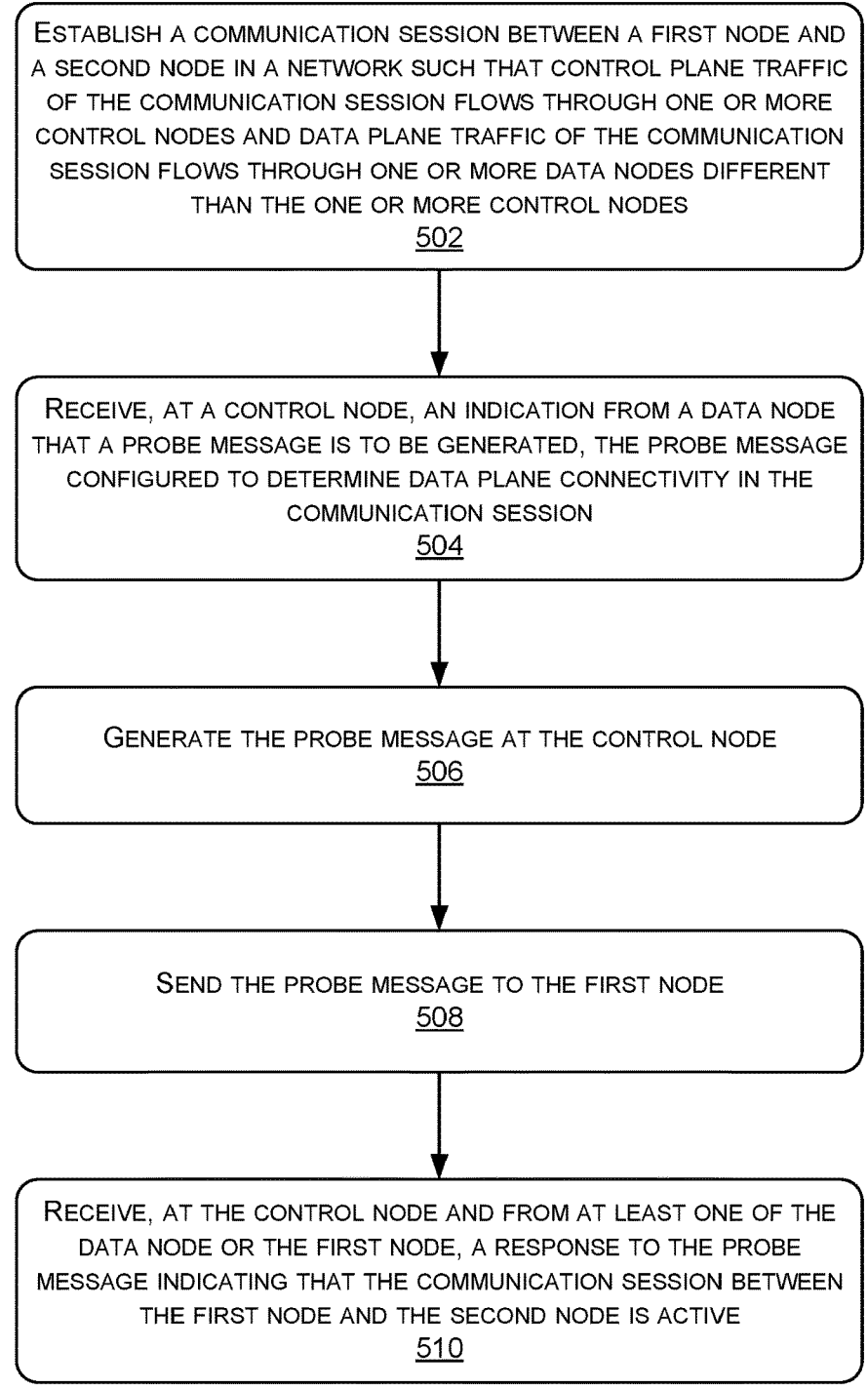
FIG. 5 illustrates a logic flow diagram of an example method for sending a probe message in a tunneled communication session comprising split control plane and data plane traffic flows.
Figure 6:
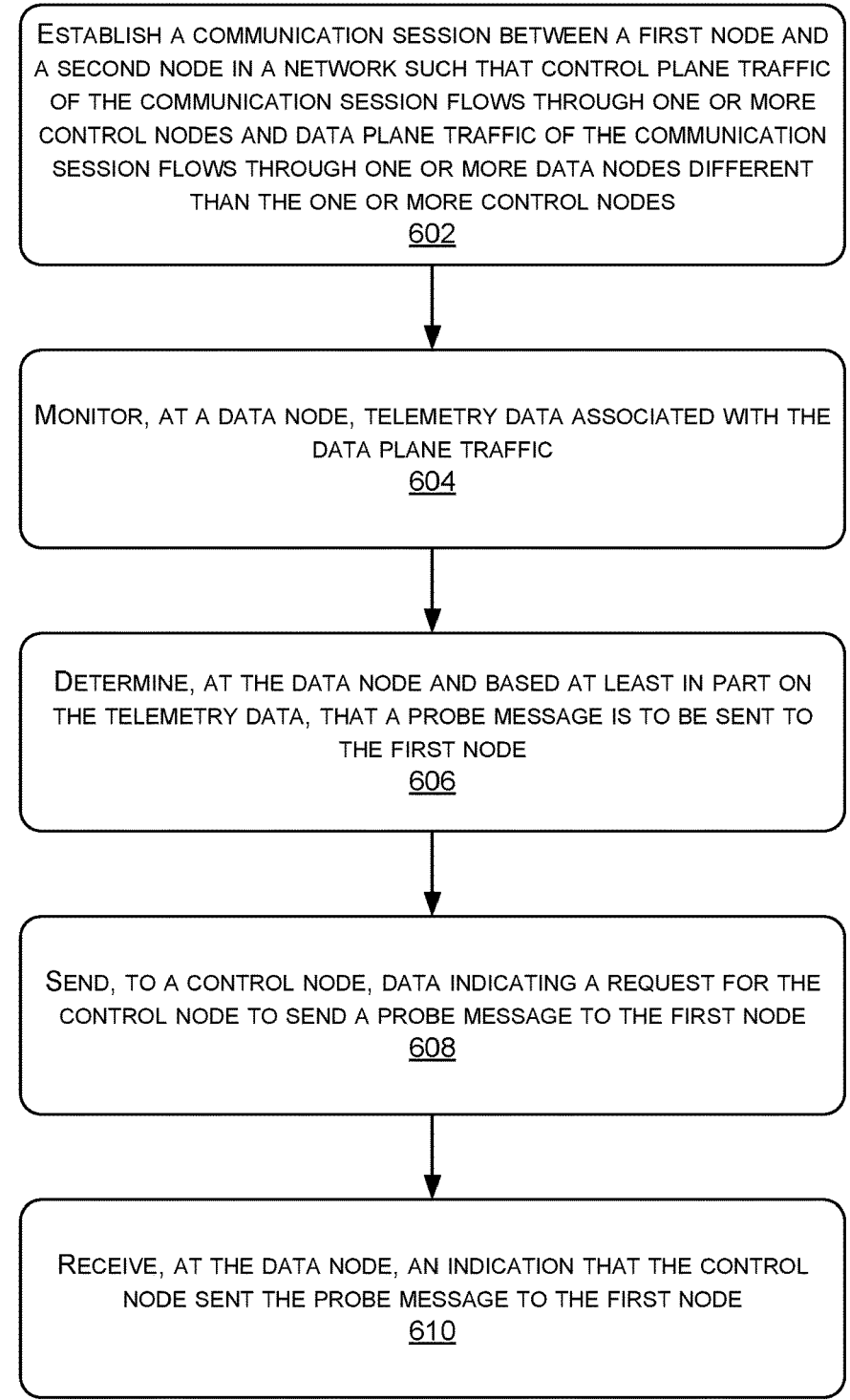
FIG. 6 illustrates a logic flow diagram of another example method for sending a probe message in a tunneled communication session comprising split control plane and data plane traffic flows.
Figure 7:
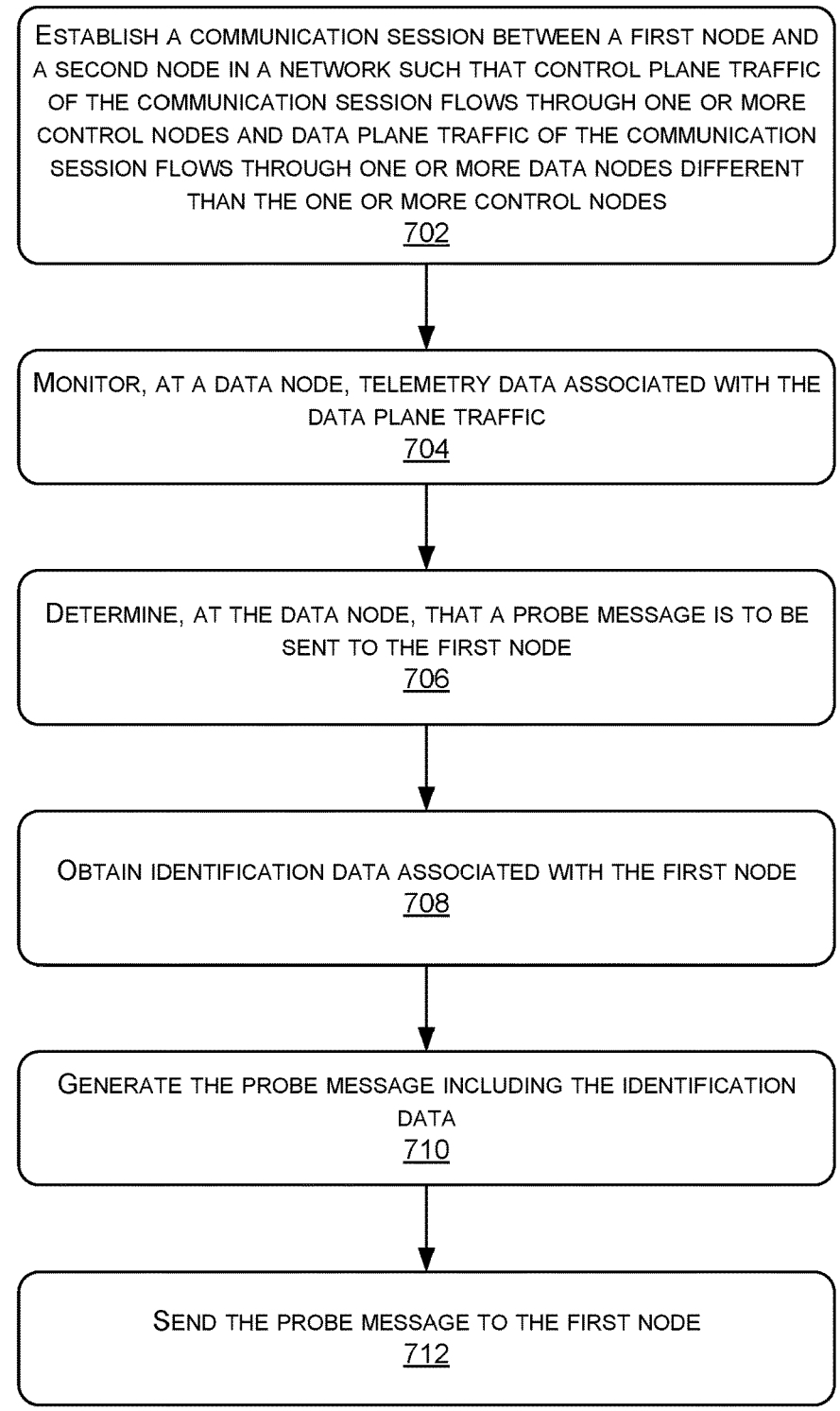
FIG. 7 illustrates a logic flow diagram of yet another example method for sending a probe message in a tunneled communication session comprising split control plane and data plane traffic flows.

FIGS. 5, 6, and 7 illustrate logic flow diagrams of various example methods for sending probe messages in a tunneled communication session that comprises split control plane and data plane traffic flows. The logical operations described herein with respect to FIGS. 5, 6, and 7 may be implemented (1) as a sequence of computer-implemented acts or program modules running on a computing system and/or (2) as interconnected machine logic circuits or circuit modules within a computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5, 6, and 7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 5 illustrates a logic flow diagram of an example method 500 for sending a probe message in a tunneled communication session comprising split control plane and data plane traffic flows. In examples, the method 500 may be implemented by one or more nodes, devices, components, etc. of the example system-architecture 100, as well as other nodes, devices, components, and systems described herein.

At 502, the method 500 may include establishing a communication session between a first node and a second node in a network such that control plane traffic of the communication session flows through one or more control nodes and data plane traffic of the communication session flows through one or more data nodes different than the one or more control nodes. In some examples the communication session may include an IPsec traffic flow, the control plane traffic may include one or more IKE protocol packets, and the data plane traffic may include one or more ESP protocol packets. Additionally, the control nodes may include IKE nodes and the data nodes may include ESP data nodes.

At 504, the method 500 may include receiving, at a control node, an indication from a data node that a probe message is to be generated, the probe message configured to determine data plane connectivity in the communication session. In some examples, the probe message may include an IKE DPD message.

In at least one example, receiving the indication that the probe message is to be generated may include receiving telemetry data associated with the data plane traffic of the communication session and determining, based at least in part on the telemetry data, that the data plane traffic is inactive. The control node may access a key-value store to receive the telemetry data. In some examples, receiving the indication that the probe message is to be generated may include receiving a prompt from the data node for the control node to generate the probe message. Additionally, or alternatively, receiving the indication that the probe message is to be generated may include receiving data indicating that the probe message needs to be generated from a message bus associated with the communication session and determining, based at least in part on the data, that the control node is associated with the communication session between the first node and the second node. For instance, the control node may have a control plane traffic channel open and/or active with the first node and/or the second node.

At 506, the method 500 may include generating the probe message at the control node. In at least one example, the probe message may comprise an IKE DPD message. In some examples, generating the probe message at the control node may be based at least in part on receiving the indication from the data node that the probe message is to be generated. For instance, generating the probe message may be based at least in part on receiving the telemetry data and/or determining that the data plane traffic is inactive based at least in part on the telemetry data. Additionally, or alternatively, generating the probe message may be based at least in part on receiving the prompt from the data node that the probe message is to be generated and/or receiving the data indicating that the probe message needs to be generated from the message bus.

At 508, the method 500 may include sending the probe message to the first node. In at least one example, the control node may send the probe message to the first node. Additionally, the probe message may be sent via the control plane traffic channel. At 510, the method 500 may include receiving, at the control node and from at least one of the data node or the first node, a response to the probe message indicating that the communication session between the first node and the second node is active. In some examples, the response to the probe message may include an IKE DPD response packet.

FIG. 6 illustrates a logic flow diagram of another example method for sending a probe message in a tunneled communication session comprising split control plane and data plane traffic flows. In examples, the method 600 may be implemented by one or more nodes, devices, components, etc. of the example system-architecture 100, as well as other nodes, devices, components, and systems described herein.

At 602, the method 600 may include establishing a communication session between a first node and a second node in a network such that control plane traffic of the communication session flows through one or more control nodes and data plane traffic of the communication session flows through one or more data nodes different than the one or more control nodes. In some examples the communication session may include an IPsec traffic flow, the control plane traffic may include one or more IKE protocol packets, and the data plane traffic may include one or more ESP protocol packets. Additionally, the control nodes may include IKE nodes and the data nodes may include ESP data nodes.

At 604, the method 600 may include monitoring, at a data node, telemetry data associated with the data plane traffic. In various examples, the telemetry data may include any kind of logical representation of the tunneled traffic, such as virtual tunnel interface (VTI) data associated with an IPsec traffic flow, IPsec tunnel data associated with an IPsec traffic flow, XFRM interface data, and/or other data associated with various communication protocols. In examples, the data node may determine, based at least in part on the telemetry data, a lapse in the flow of data plane traffic between the first node and the second node (e.g., a decrease in the flow of data plane traffic, a cessation of the flow of data plane traffic, a pause in the flow of data plane traffic, etc) and/or an error condition associated with the communication session between the first node and the second node.

At 606, the method 600 may include determining, at the data node and based at least in part on the telemetry data, that a probe message is to be sent to the first node. In some examples, determining that the probe message is to be sent may be based at least in part on a lapse in the flow of data plane traffic or an error condition associated with the communication session.

At 608, the method 600 may include sending, to a control node, data indicating a request for the control node to send a probe message to the first node. In some examples, sending the data indicating the request for the control node to send the probe message may be and based at least in part on determining that the probe message is to be sent. Additionally, in at least one example, sending the data indicating the request for the control node to send the probe message may include signaling that the probe message needs to be sent to the first node through a message bus associated with the communication session.

At 610, the method 600 may include receiving, at the data node, an indication that the control node sent the probe message to the first node. In some examples, receiving the indication may include receiving data indicating that a message was sent to a message bus associated with the communication session between the first node and the second node, wherein the message includes the indication that the control node sent the probe message. The data node may determine that the data node is associated with the communication session between the first node and the second nodes. In this way, the data node may receive the message including the indication based at least in part on determining that the data node is associated with the communication and/or that the message is associated with the communication session.

FIG. 7 illustrates a logic flow diagram of yet another example method for sending a probe message in a tunneled communication session comprising split control plane and data plane traffic flows. In examples, the method 700 may be implemented by one or more nodes, devices, components, etc. of the example system-architecture 100, as well as other nodes, devices, components, and systems described herein.

At 702, the method 700 may include establishing a communication session between a first node and a second node in a network such that control plane traffic of the communication session flows through one or more control nodes and data plane traffic of the communication session flows through one or more data nodes different than the one or more control nodes. In some examples the communication session may include an IPsec traffic flow, the control plane traffic may include one or more IKE protocol packets, and the data plane traffic may include one or more ESP protocol packets. Additionally, the control nodes may include IKE nodes and the data nodes may include ESP data nodes.

At 704, the method 700 may include monitoring, at a data node, telemetry data associated with the data plane traffic. In various examples, the telemetry data may include any kind of logical representation of the tunneled traffic, such as virtual tunnel interface (VTI) data associated with an IPsec traffic flow, IPsec tunnel data associated with an IPsec traffic flow, XFRM interface data, and/or other data associated with various communication protocols. In examples, the data node may determine, based at least in part on the telemetry data, a lapse in the flow of data plane traffic between the first node and the second node (e.g., a decrease in the flow of data plane traffic, a cessation of the flow of data plane traffic, a pause in the flow of data plane traffic, etc) and/or an error condition associated with the communication session between the first node and the second node.

At 706, the method 700 may include determining, at the data node, that a probe message is to be sent to the first node. In some examples, determining that the probe message is to be sent may be based at least in part on the telemetry data. Additionally, or alternatively, determining that the probe message is to be sent may be based at least in part on determining a lapse in the flow of data plane traffic or an error condition associated with the communication session.

At 708, the method 700 may include obtaining identification data associated with the first node. In various examples, the data node may obtain the identification data based at least in part on determining to send the probe message to the first node. In at least one example, the identification may include key-value data associated with the first node, and the data node may obtain the key-value data from a key-value store associated with the communication session.

At 710, the method 700 may include generating the probe message including the identification data and, at 712, the method 700 may include sending the probe message to the first node. In at least one example, the probe message may comprise an IKE DPD message. In some examples, the data node may send the probe message to the first node via the control plane traffic channel and/or according to a control plane protocol (e.g., IKE).

In some examples, based at least in part on at least one of determining that the probe message is to be sent and/or sending the probe message to the first node, the data node may send, to a message bus associated with the communication session, data indicating that the probe message was sent to the first node. Additionally, when the data node receives, from the first node, a response to the probe message indicating that the communication session between the first node and the second node is active, the data node may send the response to the probe message to a control node of the one or more control nodes.

Figure 8:
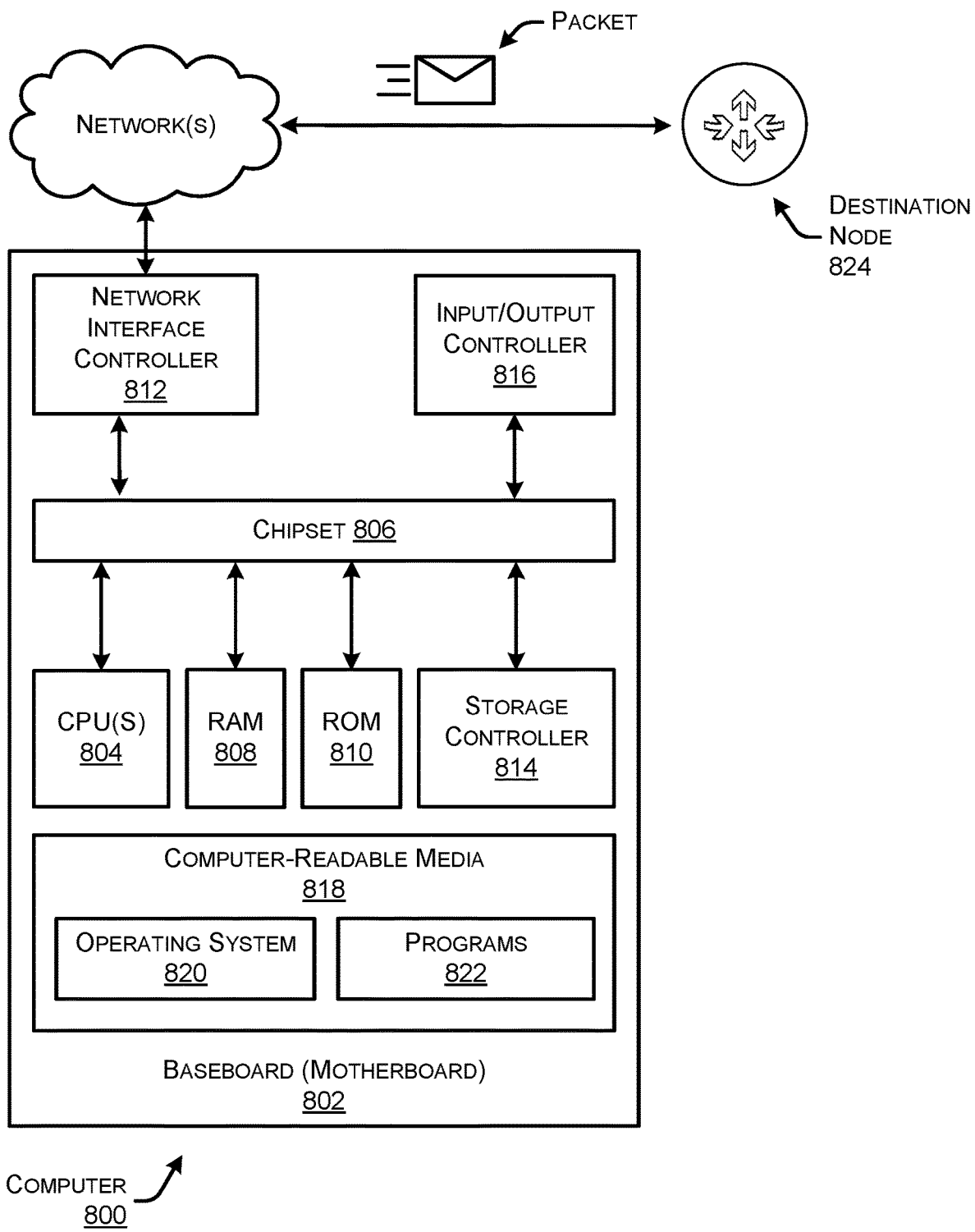
FIG. 8 illustrates a schematic view of an example computer-hardware architecture for implementing a network device and/or network node that can be utilized to implement aspects of the various technologies presented herein.

FIG. 8 illustrates a schematic view of an example computer architecture for implementing a network device and/or network node that can be utilized to implement aspects of the various technologies presented herein. The computer architecture shown in FIG. 8 illustrates a conventional server computer, network device, workstation, desktop computer, laptop, tablet, network appliance, e-reader, smartphone, and/or other computing device, and can be utilized to execute any of the software components presented herein. The computer 800 may comprise networked devices such as servers, switches, routers, hubs, bridges, gateways, modems, repeaters, access points, etc.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the client network(s) 122 and/or the network(s) 126(a)-(b). The chipset 806 can include functionality for providing network connectivity through a NIC 812, such as a gigabit Ethernet adapter. The NIC 812 is capable of connecting the computer 800 to other computing devices over the network. It should be appreciated that multiple NICs 812 can be present in the computer 800, connecting the computer to other types of networks and remote computer systems. In some examples, the NIC 812 may be configured to perform at least some of the techniques described herein, and may include components for performing the techniques described herein.

The computer 800 can be connected to a storage device 818 that provides non-volatile storage for the computer. The storage device 818 can store an operating system 820, programs 822, and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by the system-architecture 100 and or any components included therein, may be supported by one or more devices similar to computer 800. Stated otherwise, some or all of the operations performed by the system-architecture 100, and or any components included therein, may be performed by one or more computer devices 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington According to further embodiments, the operating system can comprise the UNIX operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-7. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

As described herein, the computer 800 may comprise one or more of data nodes, control nodes, firewall nodes, edge routers, and/or key-value stores. The computer 800 may include one or more hardware processors 804 (processors) configured to execute one or more stored instructions. The processor(s) 804 may comprise one or more cores. Further, the computer 800 may include one or more network interfaces configured to provide communications between the computer 800 and other devices, such as the communications described herein as being performed by the data nodes, control nodes, firewall nodes, edge routers, and/or key-value store. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure for detecting inactive peers of a tunneled communication session, while allowing for a scalable tunneled protocol that includes split control plane nodes and data plane nodes. The destination node 824 may comprise any one of a data node 102(*a*)-(*n*), control node 104(*a*)-(*n*), key-value store 106, edge router 110(*a*)-(*b*), firewall node 112(*a*)-(*n*), client router 116, client node, responding node, and/or any other network devices or nodes described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
  receiving, at a data node of a network, telemetry data associated with a communication session, wherein data plane traffic of the communication session flows through the data node;
  determining, by the data node and based at least in part on the telemetry data, an abnormal condition associated with the data plane traffic;

determining, by the data node and based at least in part on the abnormal condition, that a probe message is to be sent to a client node of the communication session to verify connectivity; and at least one of:
sending, by the data node, the probe message to the client node based at least in part on obtaining information to generate the probe message; or
sending, by the data node, an indication to a control node of the network that the probe message is to be sent to the client node, wherein control plane traffic of the communication session flows through the control node.

2. The method of claim 1, further comprising receiving, at the data node and from the control node via a message bus associated with the communication session, an indication that the control node sent the probe message to the client node.

3. The method of claim 1, wherein the communication session comprises an internet protocol security (IPsec) traffic flow and the probe message comprises an internet key exchange (IKE) dead peer detection (DPD) message.

4. The method of claim 3, wherein the telemetry data comprises at least one of virtual tunnel interface (VTI) data associated with the IPsec traffic flow, IPsec tunnel data associated with the IPsec traffic flow, or xfrm data associated with the IPsec traffic flow.

5. The method of claim 1, wherein the information for the data node to generate the probe message is obtained by the data node from a key-value store associated with the communication session, the information stored in the key-value store by the control node.

6. The method of claim 1, wherein sending the indication to the control node that the probe message is to be sent to the client node further comprises sending a security parameter index (SPI) value associated with the client node.

7. The method of claim 6, wherein the indication is sent to the control node via a message bus associated with the communication session, the message bus accessible to multiple control nodes and multiple data nodes of the network.

8. A system associated with a data node of a network, the data node configured to process data plane traffic of a communication session that flows through the network, the system comprising:
one or more processors; and
one or more non-transitory computer-readable media storing instructions that, when executed by the one or more processors, cause the data node to perform operations comprising:
receiving telemetry data associated with the data plane traffic of the communication session;
determining, based at least in part on the telemetry data, an abnormal condition associated with the data plane traffic;
determining, based at least in part on the abnormal condition, that a probe message is to be sent to a client node of the communication session to verify connectivity; and
at least one of:
sending the probe message to the client node based at least in part on obtaining information to generate the probe message; or
sending an indication to a control node of the network that the probe message is to be sent to the client node, the control node configured to process control plane traffic of the communication session.

9. The system of claim 8, the operations further comprising receiving, from the control node via a message bus associated with the communication session, an indication that the control node sent the probe message to the client node.

10. The system of claim 8, wherein the communication session comprises an internet protocol security (IPsec) traffic flow and the probe message comprises an internet key exchange (IKE) dead peer detection (DPD) message.

11. The system of claim 10, wherein the telemetry data comprises at least one of virtual tunnel interface (VTI) data associated with the IPsec traffic flow, IPsec tunnel data associated with the IPsec traffic flow, or xfrm data associated with the IPsec traffic flow.

12. The system of claim 8, wherein the information to generate the probe message is obtained by the data node from a key-value store associated with the communication session, the information stored in the key-value store by the control node.

13. The system of claim 8, wherein sending the indication to the control node that the probe message is to be sent to the client node further comprises sending a security parameter index (SPI) value associated with the client node.

14. The system of claim 13, wherein the indication is sent to the control node via a message bus associated with the communication session, the message bus accessible to multiple control nodes and multiple data nodes of the network.

15. A method comprising:
receiving, at a control node of a network that is configured to process control plane traffic of a communication session that flows through the network, telemetry data associated with data plane traffic of the communication session that is processed by a data node of the network;
determining, by the control node and based at least in part on the telemetry data, an abnormal condition associated with the data plane traffic;
determining, by the control node and based at least in part on the abnormal condition, to generate a probe message to determine data plane connectivity in the communication session;
generating, by the control node, the probe message; and
sending the probe message to a client node of the communication session.

16. The method of claim 15, wherein receiving the telemetry data comprises accessing, by the control node, a key-value store in which the telemetry data is published to by the data node.

17. The method of claim 15, wherein the communication session is an internet protocol security (IPsec) traffic flow, the control plane traffic is internet key exchange (IKE) traffic, the data plane traffic is encapsulating security payload (ESP) traffic, and the probe message is an IKE dead peer detection (DPD) message.

18. Them method of claim 1, wherein the abnormal condition is at least one of a lapse in flow of the data plane traffic or an error condition associated with the communication session.

19. Them system of claim 8, wherein the abnormal condition is at least one of a lapse in flow of the data plane traffic or an error condition associated with the communication session.

20. The method of claim 15, wherein:
the abnormal condition is at least one of a lapse in flow of the data plane traffic or an error condition associated with the communication session, and the control node and the data node are running on separate host devices associated with the network.

\* \* \* \* \*